(12) United States Patent
Kim

(10) Patent No.: US 12,279,744 B2
(45) Date of Patent: Apr. 22, 2025

(54) ROBOT VACUUM CLEANER AND CONTROL METHOD THEREOF

(71) Applicant: SAMSUNG ELECTRONICS CO., LTD., Suwon-si (KR)

(72) Inventor: Seonghwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 17/704,971

(22) Filed: Mar. 25, 2022

(65) Prior Publication Data

US 2022/0211237 A1 Jul. 7, 2022

Related U.S. Application Data

(63) Continuation of application No. PCT/KR2020/008932, filed on Jul. 8, 2020.

(30) Foreign Application Priority Data

Sep. 25, 2019 (KR) .................. 10-2019-0118274

(51) Int. Cl.
*A47L 9/28* (2006.01)
*G01D 1/00* (2006.01)

(52) U.S. Cl.
CPC ........... *A47L 9/2847* (2013.01); *A47L 9/2805* (2013.01); *A47L 9/2842* (2013.01); *A47L 9/2852* (2013.01);
(Continued)

(58) Field of Classification Search
CPC ......... G05D 2201/0215; G05D 1/0225; G05D 1/648; A47L 2201/024; A47L 2201/02;
(Continued)

(56) References Cited

U.S. PATENT DOCUMENTS 9,480,379 B2 11/2016 Yoon et al.
9,931,007 B2 4/2018 Morin et al.
(Continued)

FOREIGN PATENT DOCUMENTS

EP 2273336 B1 10/2013
JP 2014108356 A 6/2014
(Continued)

OTHER PUBLICATIONS

International Search Report (PCT/ISA/210) and Written Opinion (PCT/ISA/237) dated Sep. 29, 2020 issued by the International Searching Authority in International Application No. PCT/KR2020/008932.
(Continued)

*Primary Examiner* — Khoi H Tran
*Assistant Examiner* — Tanner L Cullen
(74) *Attorney, Agent, or Firm* — Sughrue Mion, PLLC

(57) ABSTRACT

A robot vacuum cleaner and a controlling method thereof are provided. The robot vacuum cleaner includes a driver configured to move the robot vacuum cleaner; a memory storing information about a charging station of the robot vacuum cleaner; and a processor configured to: based on entering a return mode for returning to the charging station, control the driver to move the robot vacuum cleaner to the charging station based on the information about the charging station stored in the memory; perform a dust removal operation based on a distance between the robot vacuum cleaner and the charging station being less than or equal to a critical distance; and control the driver to move the robot vacuum cleaner such that the robot vacuum cleaner is in contact with the charging station after the dust removal operation.

9 Claims, 6 Drawing Sheets

(52) U.S. Cl.
CPC ....... *A47L 9/2884* (2013.01); *A47L 2201/022* (2013.01); *A47L 2201/06* (2013.01)

(58) Field of Classification Search
CPC ........... A47L 2201/022; A47L 2201/06; A47L 2201/04; A47L 9/2873; A47L 9/106
See application file for complete search history.

(56) References Cited

U.S. PATENT DOCUMENTS

| | | |
|---|---|---|
| 9,931,008 B2 | 4/2018 | Yoo et al. |
| 10,022,028 B2 | 7/2018 | Tsuboi et al. |
| 2006/0037170 A1* | 2/2006 | Shimizu ................ A47L 9/0477 15/319 |
| 2007/0245511 A1* | 10/2007 | Hahm ..................... A47L 9/106 134/21 |
| 2013/0056026 A1 | 3/2013 | Jung et al. |
| 2018/0184868 A1 | 7/2018 | Han |
| 2018/0354132 A1 | 12/2018 | Noh et al. |
| 2019/0343358 A1* | 11/2019 | Davis ................... G05D 1/0088 |
| 2020/0022552 A1* | 1/2020 | Han ..................... A47L 9/2826 |
| 2020/0329935 A1 | 10/2020 | Park et al. |
| 2022/0175206 A1* | 6/2022 | Li ....................... A47L 11/4091 |

FOREIGN PATENT DOCUMENTS

| | | | |
|---|---|---|---|
| JP | 2018112799 A | 7/2018 | |
| JP | 6382634 B2 | 8/2018 | |
| KR | 100486498 B1 | 4/2005 | |
| KR | 1020090051319 A | 5/2009 | |
| KR | 101412580 B1 * | 6/2014 | .............. A47L 11/24 |
| KR | 1020190053730 A | 5/2019 | |
| KR | 20190088824 A * | 7/2019 | .......... A47L 11/4002 |
| KR | 1020190088824 A | 7/2019 | |

OTHER PUBLICATIONS

Communication dated Jun. 4, 2024, issued by the Korean Intellectual Property Office in Korean Patent Application No. 10-2019-0118274.

* cited by examiner

ROBOT VACUUM CLEANER AND CONTROL METHOD THEREOF

CROSS-REFERENCE TO RELATED APPLICATION(S)

This application is a by-pass continuation application of International PCT Application No. PCT/KR2020/008932 filed on Jul. 8, 2020, which is based on and claims priority to Korean Patent Application No. 10-2019-0118274 filed on Sep. 25, 2019 in the Korean Intellectual Property Office, the disclosures of which are incorporated by reference herein in their entirety.

BACKGROUND

1. Field

The disclosure relates to a robot vacuum cleaner and a control method thereof, more particularly to a robot vacuum cleaner that enters a return mode and removes dust around the robot vacuum cleaner by performing a dust removal operation immediately before coming into contact with a charging station and a control method thereof.

2. Description of Related Art

A robot vacuum cleaner is a device that cleans a certain area on its own without a user's manipulation. A charging station is a device for charging the robot vacuum cleaner and may be fixedly disposed at a predetermined location.

In the related art, there is a problem in that when the robot vacuum cleaner returns to the charging station, dust is accumulated near the charging station as the robot vacuum cleaner drags the collected dust when returning to the charging station.

There have been methods for removing dust from the charging station, but there is a limitation in removing the dust for the charging station having a fixed location, and there is a problem in that a manufacturing cost of the charging station is increased.

SUMMARY

Provided is a robot vacuum cleaner for removing dust around the robot vacuum cleaner before the robot vacuum cleaner returns to a charging station, and a control method thereof.

Additional aspects will be set forth in part in the description which follows, and in part, will be apparent from the description, or may be learned by practice of the presented embodiments.

In accordance with an aspect of the disclosure, there is provided a robot vacuum cleaner including: a driver configured to move the robot vacuum cleaner; a memory storing information about a charging station of the robot vacuum cleaner; and a processor configured to: based on entering a return mode for returning to the charging station, control the driver to move the robot vacuum cleaner to the charging station based on the information about the charging station stored in the memory; perform a dust removal operation based on a distance between the robot vacuum cleaner and the charging station being less than or equal to a critical distance; and control the driver to move the robot vacuum cleaner such that the robot vacuum cleaner is in contact with the charging station after the dust removal operation.

The robot vacuum cleaner may further include a suction unit for collecting dust, and the dust removal operation may include stopping an operation of the driver and operating the suction unit to remove dust around the suction unit.

The robot vacuum cleaner may further include a side brush, and the dust removal operation may include stopping an operation of the driver and operating the side brush to remove dust around the side brush.

The dust removal operation may further include stopping the operation of the suction unit and moving the robot vacuum cleaner in a first direction and a second direction to remove dust attached to the robot vacuum cleaner.

The processor is further configured to: control the driver to move the robot vacuum cleaner within a predetermined distance radius from a current location of the robot vacuum cleaner, based on the distance between the robot vacuum cleaner and the charging station being less than or equal to the critical distance; and perform the dust removal operation while moving within the predetermined distance radius.

The robot vacuum cleaner further includes: a battery for supplying power of the robot vacuum cleaner, wherein the processor is further configured to control the robot vacuum cleaner to enter the return mode based on a remaining capacity of the battery becoming a predetermined value.

The robot vacuum cleaner further includes: a communicator, wherein the processor is further configured to control the communicator to receive a command with respect to the return mode from the charging station.

The memory stores map information about a cleaning area, wherein the processor is configured to acquire information about a distance to the charging station based on the map information.

The robot vacuum cleaner further includes: a distance sensor configured to measure a distance to the charging station, wherein the processor is further configured to acquire information about the distance to the charging station through the distance sensor.

The processor is further configured to: perform a cleaning operation around the charging station after the dust removal operation, and control the driver to come into contact with the charging station after the cleaning operation.

In accordance with an aspect of the disclosure, there is provided a method of controlling a robot vacuum cleaner including: based on entering a return mode for returning to a charging station, moving the robot vacuum cleaner to the charging station; based on a distance between the robot vacuum cleaner and the charging station being less than or equal to a critical distance, performing a dust removal operation; and controlling the robot vacuum cleaner to be in contact with the charging station after the dust removal operation.

The dust removal operation may include stopping a movement of the robot vacuum cleaner and operating a suction unit of the robot vacuum cleaner to remove dust around the suction unit.

The dust removal operation may include stopping a movement of the robot vacuum cleaner and operating a side brush of the robot vacuum cleaner to remove dust around the side brush.

The dust removal operation may further include stopping the operation of the suction unit and moving the robot vacuum cleaner in a first direction and a second direction to remove dust attached to the robot vacuum cleaner.

The performing the dust removal operation includes: based on the distance between the robot vacuum cleaner and the charging station being less than or equal to the critical distance, moving the robot vacuum cleaner within a predetermined distance radius from a current location of the robot vacuum cleaner; and performing the dust removal operation while moving within the predetermined distance radius.

According to one or more embodiments of the disclosure, a robot vacuum cleaner may prevent dust from accumulating in the charging station by performing a dust removal operation around the robot vacuum cleaner before the robot vacuum cleaner returns to the charging station.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, the disclosure will be described in detail with reference to the accompanying drawings.

Figure 1:
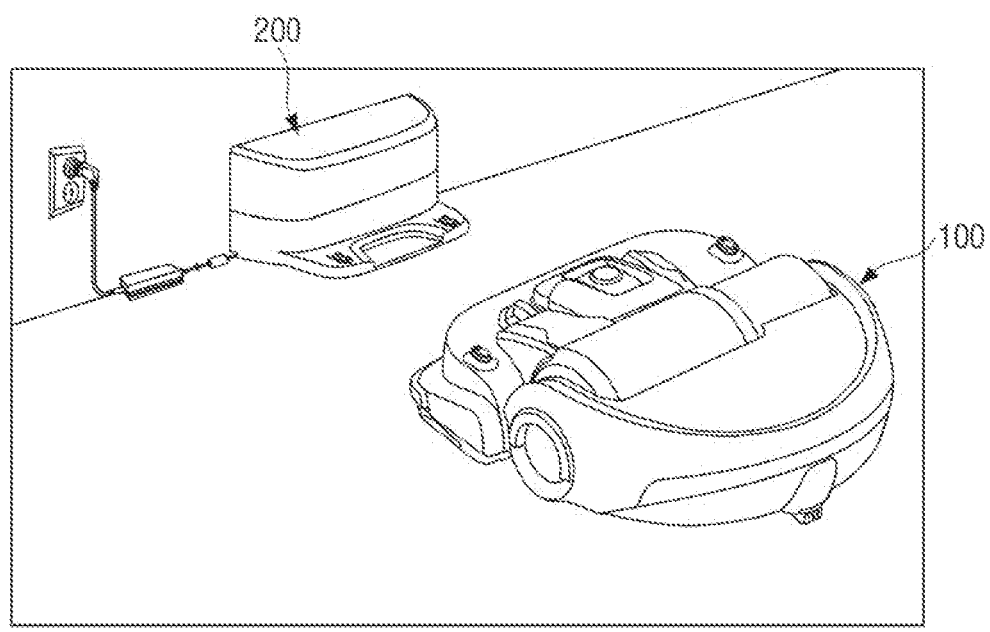
FIG. 1 is a view illustrating a robot vacuum cleaner and a charging station according to an embodiment.

FIG. 1 is a view illustrating a robot vacuum cleaner and a charging station according to an embodiment.

The robot vacuum cleaner 100 refers to an electronic device for automatically drawing or collecting foreign substances or particles by means of suction. In FIG. 1, it is assumed that the robot vacuum cleaner 100 is implemented in a flat shape in close contact with a floor to collect foreign substances or particles on the floor, but this is only an example, and the robot vacuum cleaner 100 may be implemented in various shapes and sizes.

The robot vacuum cleaner 100 and the charging station 200 may be installed inside a house, and the robot vacuum cleaner 100 may collect foreign substances and particles while moving according to a predetermined pattern or a command received from the user and remove dust from the floor. In order to clean dust, the robot vacuum cleaner 100 may include a driver including a driving motor for rotating the wheels installed on the robot vacuum cleaner 100. For example, one or more wheels can be disposed on the left and right sides of the robot vacuum cleaner 100 to move the robot vacuum cleaner 100.

In addition, the robot vacuum cleaner 100 may include a cleaning device for sucking and collecting dust. The cleaning device may include a suction unit including a suction motor for sucking dust and a side brush for collecting dust.

The charging station 200 is configured to charge the robot vacuum cleaner 100. When the robot vacuum cleaner 100 is in a return mode for returning to the charging station 200, the robot vacuum cleaner 100 may stop cleaning and move to the charging station 200. Specifically, since the robot vacuum cleaner 100 performs operations such as movement and suction during its cleaning operation, a battery of a certain capacity or more is required for the cleaning operation. Accordingly, when the battery of the robot vacuum cleaner 100 is consumed and the remaining capacity of the battery becomes a predetermined value, the robot vacuum cleaner 100 may go into the return mode for charging the battery and move to the charging station 200. The predetermined value may be preset by its manufacturer and/or may be input by the user. When the remaining capacity of the battery is a predetermined value, the robot vacuum cleaner may go into the return mode, but is not limited thereto, and the robot vacuum cleaner 100 may go into the return mode due to a user input or the robot vacuum cleaner 100 may go into the return mode when the cleaning operation is completed. Also, the robot vacuum cleaner 100 may receive a command with respect to the return mode from the charging station 200 and go into the return mode.

According to an embodiment of the disclosure, the robot vacuum cleaner 100 may perform a dust removal operation when a distance to the charging station 200 is less than or equal to a critical distance while moving to the charging station 200. In other words, when the distance to the charging station 200 exceeds the critical distance while the robot vacuum cleaner 100 moves to the charging station 200, the robot vacuum cleaner 100 may move to the charging station 200 in a state that the suction unit and the side brush of the robot vacuum cleaner 100 do not operate. In addition, the robot vacuum cleaner 100 may perform a dust removal operation when the distance to the charging station 200 is less than or equal to the critical distance while moving to the charging station 200.

The critical distance may be predetermined by the manufacturer and/or may be input by the user.

According to an embodiment, the robot vacuum cleaner 100 may include a distance sensor that receives a signal transmitted by the charging station to acquire distance information from the charging station 200. The distance sensor is configured to measure a distance from the charging station 200, and when the distance sensor receives a signal transmitted from the charging station 200, the robot vacuum cleaner 100 may acquire information on a distance to the charging station 200 based on the received signal. The distance sensor may include an infrared sensor, an ultrasonic sensor, a radio frequency (RF) sensor, or the like, and may be provided on one side of an inside or outside of the robot vacuum cleaner 100.

Although it has been described that the distance information between the robot vacuum cleaner 100 and the charging station 200 is acquired using the signal received by the distance sensor, the robot vacuum cleaner 100 may be moved to the charging station by using location information of the charging station stored in a memory of the robot vacuum cleaner 100. In other words, map information on a cleaning area may be stored in the memory of the robot vacuum cleaner 100, and the robot vacuum cleaner 100 may acquire distance information from the charging station 200 based on the map information.

The dust removal operation is an operation of removing dust around the robot vacuum cleaner 100, and the robot vacuum cleaner 100 removes dust around the charging station 200, before the robot vacuum cleaner 100 comes into contact with the charging station 200, to prevent dust from accumulating.

The dust removal operation according to an embodiment of the disclosure may include a first dust removal operation in which the suction unit is operated while the robot vacuum cleaner 100 is stopped, to remove dust around the suction unit, and a second dust removal operation in which the side brush is operated while the robot vacuum cleaner 100 is stopped to remove dust around the side brush. In other words, unlike a cleaning operation in which the suction unit and the side brush are operated while the robot vacuum cleaner 100 moves, the robot vacuum cleaner 100 may remove dust around the robot vacuum cleaner 100 before coming into contact with the charging state 200 through the first dust removal operation and the second dust removal operation.

In addition, the dust removal operation may include a third dust removal operation of moving the robot vacuum cleaner 100 in a first direction and moving the robot vacuum cleaner 100 in a second direction. Through the third dust removal operation, the robot vacuum cleaner 100 may come into contact with the charging station 200 after the robot cleaner 100 drops the dust attached to the robot cleaner 100 on the floor. The first direction may be a direction different from a direction in which the robot vacuum cleaner 100 goes into the return mode and moves to the charging station 200, and the second direction may be a different direction from the first direction. According to an embodiment, the second direction may be opposite to the first direction.

According to an embodiment of the disclosure, the dust removal operation may be an operation of performing at least one of the first to third operations described above. Also, the disclosure is not limited thereto, and at least one of the first to third operations may be performed together. For example, after the third operation of making the dust attached to the robot vacuum cleaner fall on the floor is performed, the dust around the robot vacuum cleaner may be removed by performing the first dust removal operation and the second dust removal operation. However, the dust removal operation described above is not limited to the first to third operations, and may be an operation in which the suction unit and the side brush are operated like a cleaning operation while the robot vacuum cleaner 100 moves.

In addition, when a distance to the charging station 200 is less than or equal to the critical distance, the robot vacuum cleaner 100 may perform the dust removal operation while moving within a predetermined distance radius from a current location. A method for the robot vacuum cleaner 100 to perform the dust removal operation while moving within the predetermined distance radius will be described below with reference to FIG. 3.

When the dust removal operation is completed, the robot vacuum cleaner 100 may come into contact the charging station 200 to charge its battery. However, the disclosure is not limited thereto, and when the dust removal operation is completed, the robot vacuum cleaner 100 may perform a cleaning operation around the charging station 200 and come into contact with the charging station 200. The robot vacuum cleaner 100 may come into contact with the charging station 200 such that the robot vacuum cleaner 100 and the charging station 200 may be physically connected and the battery of the robot vacuum cleaner 100 may be charged, but is not limited thereto. When the robot vacuum cleaner 100 approaches the charging station 200, the battery of the robot vacuum cleaner 100 may be charged using a wireless charging method.

Through the process described above, the dust removal operation with respect to the robot vacuum cleaner 100 and around the robot vacuum cleaner 100 may be performed, thereby preventing dust from accumulating in the charging station.

Figure 2:
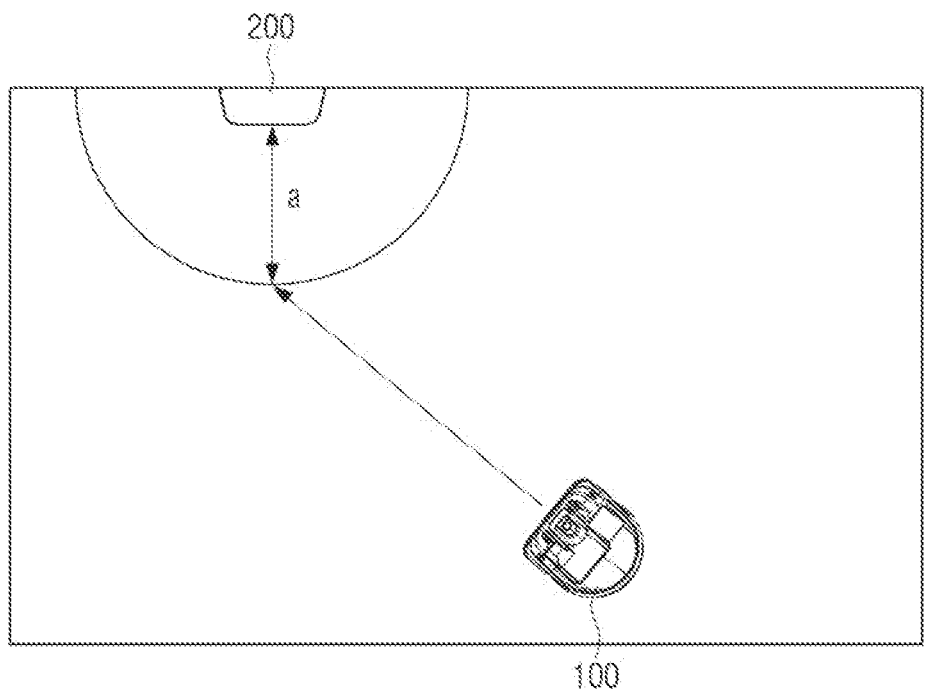
FIG. 2 is a view illustrating a movement of a robot vacuum cleaner according to an embodiment.

FIG. 2 is a view illustrating a movement of a robot vacuum cleaner according to an embodiment.

Referring to FIG. 2, when the robot vacuum cleaner 100 goes into return mode while performing a cleaning operation, it may move to the charging station 200. Specifically, the robot vacuum cleaner 100 may move to the charging station based on information about the charging station 200 stored in the memory. In other words, map information on a cleaning area may be stored in the memory of the robot vacuum cleaner 100, and the robot vacuum cleaner 100 may acquire information on the charging station 200 based on the map information. However, the disclosure is not limited thereto, and when the robot vacuum cleaner 100 includes a distance sensor, the robot vacuum cleaner 100 may acquire distance information from the charging station 200 through the distance sensor and move to the charging station 200. Alternatively or additionally, the robot vacuum cleaner 100 may use the map information and the distance information to control movement of the robot vacuum cleaner 100.

While the robot vacuum cleaner 100 is moving to the charging station 200, if a distance between the robot vacuum cleaner 100 and the charging station 200 is less than or equal to a critical distance (a), the robot vacuum cleaner 100 may perform a dust removal operation. Specifically, when the distance from the charging station 200 is less than or equal to the critical distance a, the robot vacuum cleaner 100 may stop moving and operate a suction unit or operate a side brush to perform dust removal. In addition, the robot vacuum cleaner 100 may stop the operation of the suction unit and the side brush, move in a second direction after moving in a first direction, and perform the dust removal operation.

The critical distance a between the robot vacuum cleaner 100 and the charging station 200 may be predetermined by a manufacturer and/or may be input by the user.

In an embodiment according to the disclosure, when map information with respect to a cleaning area is stored in the memory of the robot vacuum cleaner 100, the robot vacuum cleaner 100 may acquire distance information from the charging station based on the map information, and may identify, based on the acquired distance information, whether the distance to the charging station 200 is equal to or less than the critical distance a. The map information on the cleaning area may include an area to be cleaned by the robot vacuum cleaner 100 and location information of the charging station 200 in a shape of a space to be cleaned. According to an embodiment, when there is no map information in the memory of the robot vacuum cleaner 100, the robot vacuum cleaner 100 may move according to a predetermined algorithm, and may generate map information according to a movement trajectory of the robot vacuum cleaner 100. Also, distance information between the robot vacuum cleaner 100 and the charging station 200 may be acquired by storing the generated map information in the memory as in the method described above.

In an embodiment according to the disclosure, when the robot vacuum cleaner 100 further includes a distance sensor for measuring the distance to the charging station 200, the robot vacuum cleaner 100 may acquire distance information to the charging station 200 through the distance sensor. Specifically, the distance sensor may receive a signal transmitted from the charging station 200, and the robot vacuum cleaner 100 may acquire distance information between the robot vacuum cleaner 100 and the charging station 200 based on a strength of the received signal. Based on the acquired distance information, the robot vacuum cleaner 100 may identify whether the distance to the charging station 200 is equal to or less than the critical distance a.

Figure 3:
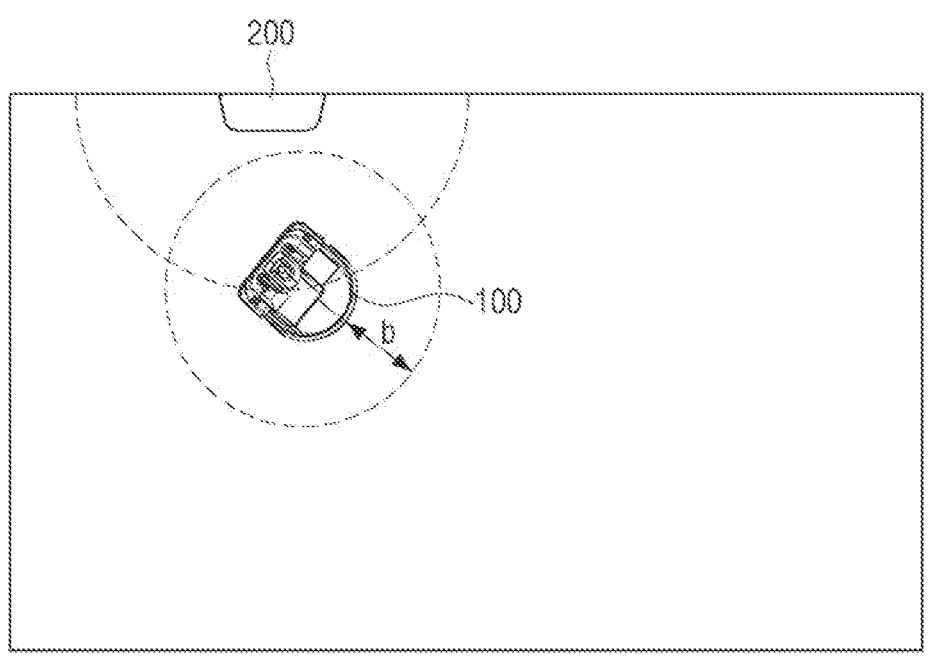
FIG. 3 is a view illustrating a method of performing a dust removal operation by a robot vacuum cleaner moving within a predetermined distance radius according to an embodiment.

FIG. 3 is a view illustrating a method of performing a dust removal operation by a robot vacuum cleaner moving within a predetermined distance radius according to an embodiment.

When the distance to the charging station 200 is less than or equal to the critical distance, the robot vacuum cleaner 100 may control a driver of the robot vacuum cleaner 100 to move within a predetermined distance radius from a current location of the robot vacuum cleaner 100. In addition, the robot vacuum cleaner 100 may perform a dust removal operation on the robot vacuum cleaner 100 while moving within the predetermined distance radius. The predetermined distance may be predetermined by the manufacturer and/or may be input by the user.

Referring to FIG. 3, the robot vacuum cleaner 100 may perform a dust removal operation while moving within a radius area of a predetermined distance b from the robot vacuum cleaner 100. Specifically, the robot vacuum cleaner 100 may operate a side brush or operate a suction unit to perform the dust removal operation with respect to the robot vacuum cleaner 100 while moving within the predetermined distance radius b. Also, the robot vacuum cleaner 100 may perform first to third dust removal operations described above with reference to FIG. 1 while moving within the predetermined distance radius b. For example, the robot vacuum cleaner 100 may stop for a predetermined time and perform a first dust removal operation that drives the suction unit, while moving within the predetermined distance radius b, and move within the predetermined distance radius b again and stop for a while to operate a second dust removal operation that drives the side brush, and move within the predetermined distance radius b again.

As described above, while the robot vacuum cleaner 100 moves within a predetermined distance radius, the robot vacuum cleaner 100 may remove dust from the robot vacuum cleaner 100 and dust around the robot vacuum cleaner 100 by performing a dust removal operation with respect to the robot vacuum cleaner 100, and return to the charging station 200.

Figure 4:
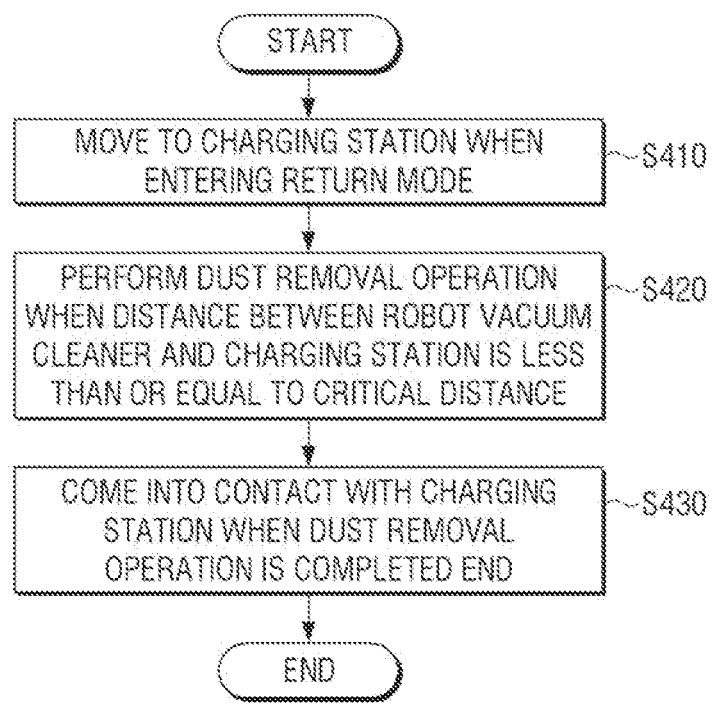
FIG. 4 is a flowchart illustrating a method of controlling a robot vacuum cleaner according to an embodiment.

FIG. 4 is a flowchart illustrating a method of controlling a robot vacuum cleaner according to an embodiment.

Referring to FIG. 4, when the robot vacuum cleaner 100 goes into the return mode, the robot vacuum cleaner 100 may move to the charging station 200 (S410). When a battery of the robot vacuum cleaner 100 is consumed and a remaining capacity of the battery becomes a predetermined value, the robot vacuum cleaner 100 may go into the return mode. However, the disclosure is not limited thereto, and the robot vacuum cleaner 100 may go into the return mode according to a user's input, and when the cleaning operation is completed, the robot vacuum cleaner 100 may go into the return mode. In addition, the robot vacuum cleaner 100 may go into the return mode by receiving a command for the return mode from the charging station 200.

While the robot vacuum cleaner 100 in the return mode and moving toward the charging station 200, when a distance between the charging station 200 and the robot vacuum cleaner 100 becomes less than or equal to a critical distance, the robot vacuum cleaner 100 may perform the dust removal operation (S420). The critical distance may be predetermined by the manufacturer and/or may be input by the user.

The dust removal operation is an operation of removing dust from the robot vacuum cleaner and dust around the robot vacuum cleaner 100, and include a first dust removal operation that removes dust around the suction unit by an operation of the suction unit while the robot vacuum cleaner 100 stops, a second dust removal operation that removes dust around the side brush by an operation of the side brush while the robot vacuum cleaner 100 stops, and a third dust removal operation that moves the robot vacuum cleaner in a second direction after moving the robot vacuum cleaner in a first direction and drops or detaches dust attached to the robot vacuum cleaner 100 on the floor.

When the dust removal operation is completed, the robot vacuum cleaner 100 may come into contact with the charging station 200 (S430). In other words, when the dust removal operation is completed, the robot vacuum cleaner 100 may return to the charging station 200 and charge the battery of the robot vacuum cleaner 100.

Figure 5:
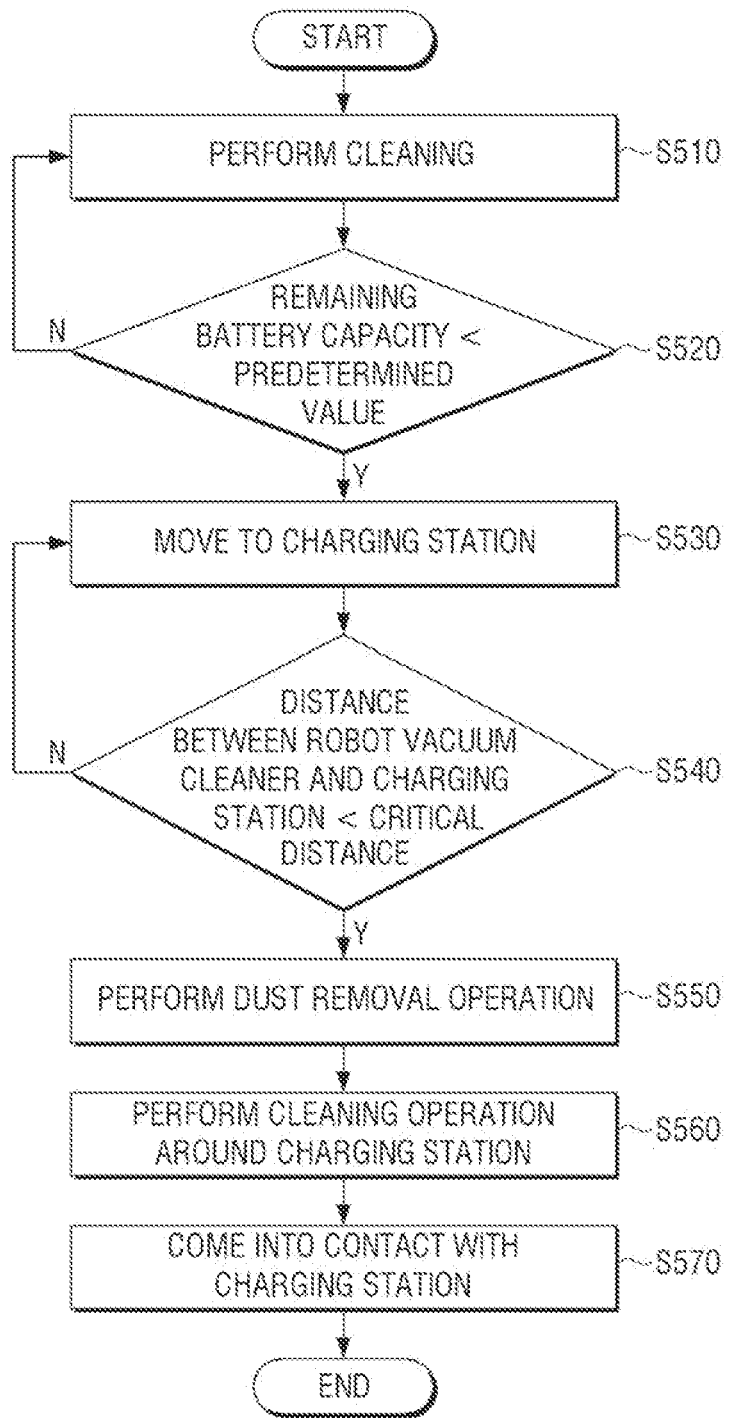
FIG. 5 is a flowchart illustrating a detailed control method of a robot vacuum cleaner according to an embodiment.

FIG. 5 is a flowchart illustrating a detailed control method of a robot vacuum cleaner according to an embodiment.

Referring to FIG. 5, the robot vacuum cleaner 100 may perform a cleaning operation (S510). When a remaining battery capacity of the robot vacuum cleaner 100 is less than or equal to a predetermined value (S520-Y), the robot vacuum cleaner 100 may move to the charging station 200 (S530). Here, the robot vacuum cleaner 100 may move to the charging station while or after performing the cleaning (S510). When the remaining battery capacity of the robot vacuum cleaner 100 exceeds the predetermined value (S520-N), the robot vacuum cleaner 100 may continue cleaning (S510).

In addition, when the distance between the robot vacuum cleaner 100 and the charging station 200 are less than a critical distance (S540-Y), the robot vacuum cleaner 100 may perform a dust removal operation (S550). The dust removal operation is an operation of removing dust from the robot vacuum cleaner 100 and dust around the robot vacuum cleaner 100. When the distance between the robot vacuum cleaner 100 and the charging station 200 exceeds the critical distance (S540-N), the robot vacuum cleaner 100 may continue to move to the charging station 200 (S530). In other words, when the distance to the charging station 200 exceeds the critical distance while the robot vacuum cleaner 100 moves to the charging station 200, the robot vacuum cleaner 100 may move to the charging station 200 in a state that the suction unit and the side brush of the robot vacuum cleaner 100 do not operate. Alternatively, when the distance to the charging station 200 exceeds the critical distance, the suction unit and the side brush of the robot vacuum cleaner 100 may continue to operate while moving to the charging station 200.

In addition, when the robot vacuum cleaner 100 completes the dust removal operation, the robot vacuum cleaner 100 may perform a cleaning operation around the charging station 200 (S560). For example, the robot vacuum cleaner 100 may detect an area around the charging station 200 based on map information about a cleaning area stored in the memory, and perform a cleaning operation on the detected surrounding area. A cleaning operation may be a task in which the robot vacuum cleaner 100 moves around the charging station 200 and the side brush and the suction unit of the robot vacuum cleaner 100 are operated. In another embodiment, the robot vacuum cleaner 100 may further include a distance sensor for measuring a distance to the charging station 200, and the robot vacuum cleaner 100 may detect an area around the charging station 200 through the distance sensor and perform a cleaning operation on the surrounding area of the charging station 200.

When the cleaning operation around the charging station 200 is completed, the robot vacuum cleaner 100 may come into contact with the charging station 200 (S570), and the battery of the robot vacuum cleaner 100 may be charged.

Figure 6:
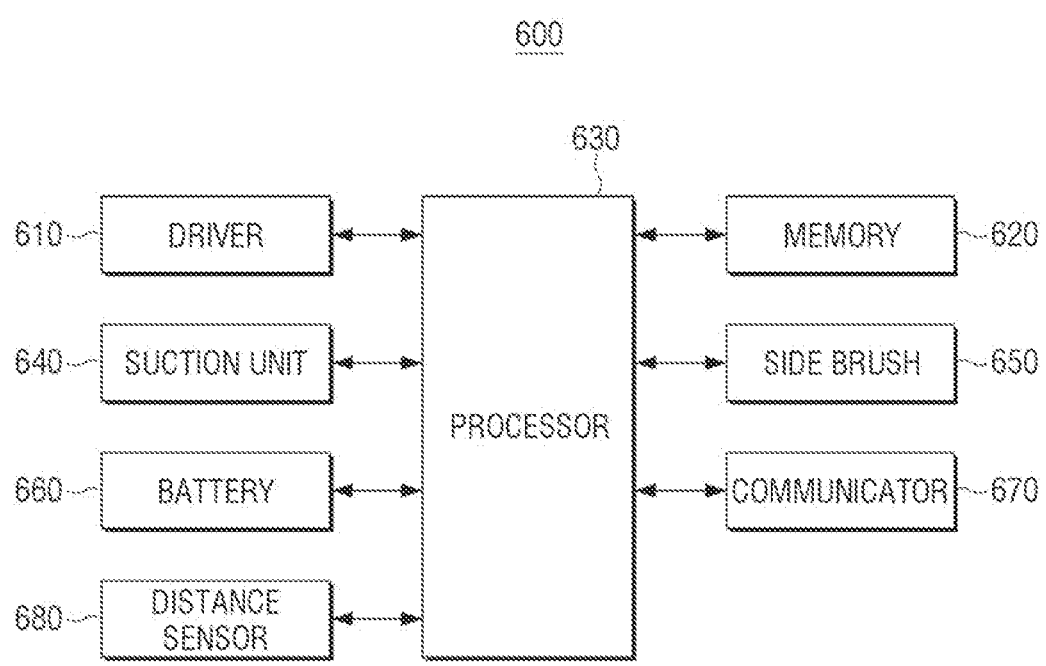
FIG. 6 is a block diagram illustrating a robot vacuum cleaner according to an embodiment.

FIG. 6 is a block diagram illustrating a robot vacuum cleaner according to an embodiment.

Referring to FIG. 6, the robot vacuum cleaner 600 may include a driver 610, a memory 620, a processor 630, a suction unit 640, a side brush 650, a battery 660, a communicator 670, and a distance sensor 680.

The driver 610 may include wheels on the left and right sides of a main body of the robot vacuum cleaner 600 and a driving motor for rotating and driving the wheels. Alternatively or additionally the driver 610 may independently rotate each driving motor of a plurality of driving motors in a forward or reverse direction according to a control signal of the processor 630. Accordingly, a rotation angle or a traveling direction of the robot vacuum cleaner 600 may be determined by differently controlling a rotational frequency of each driving motor.

The memory 620 may store map information about a place for the robot vacuum cleaner 600 to perform a task, such as a cleaning operation, and information about a charging station. The map information may be an image file such as a floor plan of an indoor space. However, the disclosure is not limited thereto, and various programs necessary for operating the robot vacuum cleaner 600 may be stored in the memory 620.

The memory 620 may store a plurality of application programs (application program or application) executed by the processor 630 of the robot vacuum cleaner 600, data and commands for operation of the robot vacuum cleaner 600. At least some of these application programs may be downloaded from an external server through wireless communication. In addition, at least some of these application programs may exist, from the time of release, on the robot vacuum cleaner 600 for a basic function of the robot vacuum cleaner 600. The application program may be stored in the memory 620, and may be executed by the processor 630 to perform the operation of the robot vacuum cleaner 600.

The memory 620 may be implemented as a non-volatile memory, a volatile memory, a flash memory, a hard disk drive (HDD) or a solid state drive (SDD). The memory 620 may be accessed by the processor 630, and perform readout, recording, correction, deletion, update, or the like, on data by the processor 630. According to an exemplary embodiment, the term "memory" as used herein may include a memory 620, a read-only memory (ROM), and a random access memory (RAM) within the processor 630, or a memory card mounted on the electronic device 600 (e.g., micro SD card, memory stick).

The processor 630 may, for example, control a number of hardware or software elements connected to the processor 630 by driving an operating system or application program, and perform various data processing and calculations. Further, the processor 630 may load and process a command or data received from at least one of the other components to a volatile memory and store diverse data in a non-volatile memory.

For this operation, the processor 630 may be realized a dedicated processor for performing functions (for example, embedded processor) or a generic-purpose processor for performing functions by running one or more software programs stored in a memory device (for example, a CPU or an application processor).

The processor 630 may perform a cleaning operation according to a user command. In addition, when going into the return mode during the cleaning operation, the processor may control the driver 610 to move to the charging station. Specifically, the processor 630 may control the driver 610 to move to the charging station based on information on the charging station stored in the memory 620. As an embodiment, the information on the charging station may be acquired based on map information on the cleaning area stored in the memory 620. However, the disclosure is not limited thereto, and the driver 610 may be controlled to move the robot vacuum cleaner 600 to the charging station while receiving a signal transmitted from the charging station through the distance sensor 680 of the robot vacuum cleaner 600.

When the robot vacuum cleaner 600 goes into the return mode, the processor 630 may control the driver 610 to move the robot vacuum cleaner 600 to the charging station.

When a battery of the robot vacuum cleaner 600 is consumed and a remaining capacity of the battery becomes a predetermined value, the robot vacuum cleaner 600 may go into the return mode for charging the battery, and the processor 630 may control the driver 610 to move the robot vacuum cleaner 600 to the charging station. A predetermined value may be predetermined by the manufacturer and/or may be input by the user. The robot vacuum cleaner 600 may go into the return mode when the remaining capacity of the battery is a predetermined value, but is not limited thereto. The robot vacuum cleaner 600 may go into the return mode according to a user input or the robot vacuum cleaner 600 may go into the return mode when the cleaning operation is completed. In addition, the processor 630 may control the communicator 670 to receive a command for the return mode from the charging station, such that the robot vacuum cleaner 600 may go into the return mode.

In addition, in the return mode, when a distance between the robot vacuum cleaner 600 and the charging station is less than or equal to a critical distance, the processor 630 may control the suction unit 640 and the side brush 650 to perform a dust removal operation with respect to the robot vacuum cleaner. When the distance to the charging station exceeds the critical distance while the robot vacuum cleaner 600 moves to the charging station, the processor 630 may control the driver 610 to move to the charging station without operating the suction unit 640 and the side brush 650. Alternatively or additionally, when the distance to the charging station exceeds the critical distance while the vacuum cleaner 600 moves to the charging station, the processor 630 may control the driver 610 to move to the charging station while the suction unit 640 and the side brush 650 are operating. The critical distance may be predetermined by the manufacturer and/or may be input by the user. Specifically, when the robot vacuum cleaner 600 goes into the return mode, the processor 630 may identify whether the robot vacuum cleaner 600 is less than the critical distance from the charging station based on the distance information between the robot vacuum cleaner 600 and the charging station.

As an example, the processor 630 may use the distance sensor 680 that receives a signal transmitted by the charging station to acquire distance information between the robot vacuum cleaner 600 and the charging station. Also, the processor 630 may control the driver 610 to move the robot vacuum cleaner 600 to the charging station by using location information of the charging station. In other words, map information on the cleaning area is stored in the memory 620 of the robot vacuum cleaner 600, and the robot vacuum cleaner 600 may acquire distance information from the charging station based on the map information.

The dust removal operation is an operation of removing dust around the robot vacuum cleaner 600, and immediately before the robot vacuum cleaner 100 comes into contact with the charging station 200, the robot vacuum cleaner 100 removes dust around the charging station 200 to prevent dust from accumulating.

The dust removal operation according to an embodiment of the disclosure may include a first dust removal operation that the processor controls the suction unit 640 to be operated in a state in which the processor 630 controls the driver to stop an operation and the robot cleaner 600 is stopped such that dust around the suction unit 640 is removed, a second dust removal operation that the processor 630 controls the side brush 650 to be operated in a state that the robot vacuum cleaner 600 is stopped such that dust around the side brush 650 is removed, and a third dust removal operation that the processor 630 controls the suction unit 640 to stop the operation, and controls the driver 610 to move the robot vacuum cleaner 600 in a first direction and in a second direction such that dust around the robot vacuum cleaner 600 falls on the floor. The first direction may be a direction different from a direction in which the robot cleaner 600 moves to the charging station, and the second direction may be a direction different from the first direction. According to an embodiment, the second direction may be an opposite direction to the first direction.

In addition, the processor 630 may control the driver 610 to move within a predetermined distance radius from a current location of the robot vacuum cleaner 600 when a distance between the robot vacuum cleaner 600 and the charging station is less than or equal to a critical distance, and the processor 630 may perform a dust removal operation while the robot vacuum cleaner 600 moves within the predetermined distance radius.

In addition, when the dust removal operation is completed, the processor 630 may control the driver 610 to bring the robot vacuum cleaner 600 into contact with the charging station. Alternatively, when the dust removal operation is completed, the processor 630 may perform a cleaning operation on the charging station, and when the cleaning operation is completed, the robot vacuum cleaner 600 may control the driver 610 to come into contact with the charging station.

The suction unit 640 may suck dust on a bottom surface of the robot vacuum cleaner 600. Specifically, the suction unit 640 may perform a cleaning operation by absorbing dust located in a lower part of the robot vacuum cleaner 600 while moving or stopped. In an embodiment, the suction unit 640 may further include an air purification unit for purifying pollutants in the air.

In addition, the suction unit 640 may have a plurality of operation modes. The plurality of operation modes may be divided according to suction strength, and may be predetermined by the user or may be changed according to the weather. For example, the operation mode may be divided into 1 to 5 according to suction strength, and when a value predetermined by the user is 3, the suction unit 640 may be operated in an operating mode of 4 or 5 higher than a value predetermined by the user, when there is a yellow dust or fine dust warning.

The side brush 650 may be disposed on a lower side of front sides of the robot vacuum cleaner 600 and may be configured to collect dust or the like into the suction unit 640. Specifically, the side brush 650 may include a rotating brush rotating in a horizontal plane with respect to the floor and a side brush motor for rotating the rotating brush. According to an embodiment of the disclosure, the processor 630 may perform a dust removal operation by controlling the side brush 650 to operate in a state where the robot vacuum cleaner 600 is stopped.

The battery 660 is configured to supply power to the robot vacuum cleaner 600, and the battery 660 of the robot vacuum cleaner 600 may be charged by the charging station. A charging method of the battery may be a constant current constant voltage (CCCV) charging method in which a predetermined capacity is rapidly charged through a constant current (CC) charging method and the remaining capacity is charged through a constant voltage (CV) method, but is not limited thereto. According to an embodiment of the disclosure, the robot vacuum cleaner 600 may go into the return mode when the remaining capacity of the battery 660 becomes a predetermined value.

The communicator 670 may be communication circuitry that is configured to connect the robot vacuum cleaner 600 to an external device (e.g., a charging station, a terminal device, an external server, or the like). For example, the communicator 670 may use any of various wireless communication methods, such as NFC, a wireless LAN, IR communication, ZigBee communication, Wi-Fi, Bluetooth, or the like. Additionally, the communicator 670 may communicate with an external device in a wired manner (e.g., Ethernet, etc.).

Further, the communicator 670 may receive access point information from an external device. For example, the communicator 670 may receive global map information including location information about a space or a location where the robot vacuum cleaner 600 is to operate, from the external device. The communicator 670 may also transmit and receive information for updating the global map information to the external device.

In addition, the communicator 670 may receive a cleaning command. The cleaning command may be a cleaning command for an entire space or a cleaning command for a specific space.

In addition, the communicator 670 may receive a return command. Specifically, when a return command is received from the user's terminal device or when a remaining capacity of the battery of the robot vacuum cleaner 600 becomes a predetermined value, the communicator may receive a command for the return mode from the charging station.

The distance sensor 680 is configured to receive a signal transmitted by the charging station to acquire distance information between the robot vacuum cleaner and the charging station. Specifically, when the distance sensor 680 receives a signal transmitted from the charging station, the processor 630 may acquire distance information from the charging station based on a magnitude of the received signal.

In addition, the distance sensor may include an infrared ray sensor, an ultrasonic sensor, a radio frequency (RF) sensor, or the like, and may be provided on one side of the inside or outside of the robot vacuum cleaner 600.

Terms used in the disclosure are selected as general terminologies currently widely used in consideration of configurations and functions of the one or more embodiments of the disclosure, but can be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall context of the disclosure.

In the disclosure, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the disclosure, the term "at least one of A or B" may designate (1) only A, (2) only B, or (3) both A and B.

The expression "first" or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

In the disclosure, the term "user" may refer to a person using a robot vacuum cleaner or a device (e.g., an artificial intelligence robot vacuum cleaner) using the robot vacuum cleaner.

What is claimed is:

1. A robot vacuum cleaner comprising:
a driver configured to move the robot vacuum cleaner;
a suction unit configured to collect dust;
a side brush;
a memory storing information about a charging station of the robot vacuum cleaner; and
a processor configured to:
based on entering a return mode for returning to the charging station, control the driver to move the robot vacuum cleaner to the charging station based on the information about the charging station stored in the memory;
perform a dust removal operation based on a distance between the robot vacuum cleaner and the charging station being less than or equal to a critical distance; and
control the driver to move the robot vacuum cleaner such that the robot vacuum cleaner is in contact with the charging station after the dust removal operation,
wherein the dust removal operation comprises:
a first dust removal operation in which the suction unit is operated while the robot vacuum cleaner is stopped to remove dust around the suction unit;
a second dust removal operation in which the side brush is operated while the robot vacuum cleaner is stopped to remove the dust around the side brush; and
a third dust removal operation in which the robot vacuum cleaner is moved in a first direction and then moved in a second direction.

2. The robot vacuum cleaner of claim 1, wherein the processor is further configured to:
control the driver to move the robot vacuum cleaner within a predetermined distance radius from a current location of the robot vacuum cleaner, based on the distance between the robot vacuum cleaner and the charging station being less than or equal to the critical distance; and
perform the dust removal operation while moving within the predetermined distance radius.

3. The robot vacuum cleaner of claim 1, further comprising:
a battery configured to supply power of the robot vacuum cleaner,
wherein the processor is further configured to control the robot vacuum cleaner to enter the return mode based on a remaining capacity of the battery becoming a predetermined value.

4. The robot vacuum cleaner of claim 1, further comprising:
a communicator,
wherein the processor is further configured to control the communicator to receive a command with respect to the return mode from the charging station.

5. The robot vacuum cleaner of claim 1, wherein the memory stores map information about a cleaning area,
wherein the processor is further configured to acquire information about a distance to the charging station based on the map information.

6. The robot vacuum cleaner of claim 1, further comprising:
a distance sensor configured to measure a distance to the charging station,
wherein the processor is further configured to acquire information about the distance to the charging station through the distance sensor.

7. The robot vacuum cleaner of claim 1, wherein the processor is further configured to:
perform a cleaning operation around the charging station after the dust removal operation, and
control the driver to come into contact with the charging station after the cleaning operation.

8. A method of controlling a robot vacuum cleaner comprises a suction unit configured to collect dust and a side brush, the method comprising:
based on entering a return mode for returning to a charging station, moving the robot vacuum cleaner to the charging station;
based on a distance between the robot vacuum cleaner and the charging station being less than or equal to a critical distance, performing a dust removal operation; and
controlling the robot vacuum cleaner to be in contact with the charging station after the dust removal operation,
wherein the dust removal operation comprises:
a first dust removal operation in which the suction unit is operated while the robot vacuum cleaner is stopped to remove dust around the suction unit;
a second dust removal operation in which the side brush is operated while the robot vacuum cleaner is stopped to remove the dust around the side brush; and
a third dust removal operation in which the robot vacuum cleaner is moved in a first direction and then moved in a second direction.

9. The method of claim 8, wherein the performing the dust removal operation comprises:
based on the distance between the robot vacuum cleaner and the charging station being less than or equal to the critical distance, moving the robot vacuum cleaner within a predetermined distance radius from a current location of the robot vacuum cleaner; and performing the dust removal operation while moving within the predetermined distance radius.

\* \* \* \* \*